United States Patent [19]
Gamay et al.

[11] Patent Number: 6,153,249
[45] Date of Patent: Nov. 28, 2000

[54] REDUCED FAT PEANUT BUTTER PRODUCT AND METHOD OF PREPARING SAME

[76] Inventors: Aly Y. Gamay, 1102 Mill Ridge, McLean, Va. 22102; Debra Root, 23852 PCH #372, Malibu, Calif. 90265

[21] Appl. No.: 08/966,068

[22] Filed: Nov. 10, 1997

[51] Int. Cl.⁷ ...................................................... A23L 1/38
[52] U.S. Cl. ............................ 426/633; 426/654; 426/658
[58] Field of Search ..................................... 426/633, 654, 426/658

[56] References Cited

U.S. PATENT DOCUMENTS

| | | |
|---|---|---|
| H1395 | 1/1995 | Prosser . |
| H1636 | 3/1997 | Sevenants et al. . |
| 4,814,195 | 3/1989 | Yokoyama et al. . |
| 4,828,868 | 5/1989 | Lasdon et al. . |
| 4,973,491 | 11/1990 | Shin et al. ................................ 426/633 |
| 5,034,242 | 7/1991 | Lasdon et al. . |
| 5,079,027 | 1/1992 | Wong et al. . |
| 5,230,919 | 7/1993 | Walling et al. . |
| 5,240,734 | 8/1993 | Izzo et al. . |
| 5,302,409 | 4/1994 | Franklin . |
| 5,366,754 | 11/1994 | Rudan et al. . |
| 5,536,524 | 7/1996 | Miller . |
| 5,591,477 | 1/1997 | Boyce et al. ............................. 426/633 |
| 5,603,979 | 2/1997 | Lasdon et al. . |

*Primary Examiner*—Helen Pratt
*Attorney, Agent, or Firm*—Reinhart, Boerner, Van Deuren, Norris & Rieselbach, s.c.

[57] ABSTRACT

A low fat peanut butter product having a water activity level of less than 0.80, which can be obtained without heating. A humectant can be used in an amount sufficient to provide a predetermined water activity level. Shelf stability is thereby obtained without discoloration or the formation of off flavors.

13 Claims, No Drawings

REDUCED FAT PEANUT BUTTER PRODUCT AND METHOD OF PREPARING SAME

BACKGROUND OF THE INVENTION

The present invention relates to a low fat peanut butter like product and, more particularly, to a low fat peanut butter product which is shelf stable at room temperature without pasteurization, addition of antimicrobial agents and/or heat treatment during preparation.

Peanut butter is a highly nutritious food containing a high level of protein. However, peanut butter also contains relatively large quantities of fat. A typical peanut butter product has an oil content of approximately 50%. Due to the high oil content and its inherently low moisture level, the typical peanut butter is highly stable at room temperature, without refrigeration, for a substantial period of time. Stable or shelf-stable in this context refers to the relative inhibition of the propagation of mold, fungus and/or bacteria.

To be labeled as peanut butter invokes various regulations of the United States Food and Drug Administration (FDA), among which: the peanut ingredients must comprise of at least 90% of the weight of the finished product. As a result, conventional peanut butter has a high oil content, with little or no appeal to health conscious consumers.

There has been a substantial amount of research directed toward reducing the caloric content of peanut butter. A thirty two gram serving of conventional peanut butter typically contains 200 calories, of which 70% are derived from a corresponding fat content of 16 grams per serving. A low-calorie, low-fat diet is imperative for many consumers with health concerns.

Most of the methods heretofore employed for oil/fat reduction use partially defatted peanut flour in conjunction with full or reduced fat peanut paste. Water may be added in varying amounts which, in turn, provides for higher moisture levels in the finished product. The term "water activity level" is described by Norman N. Potter in the book "Food Science", Third Edition, A.V.I. (1984) as a qualitative measure of unbound free water in a system that is available to support biological and chemical reactions. In general, as the water activity of a given food product decreases, its shelf life increases. A high water activity (Aw) product becomes more susceptible to mold, fungus and bacterial proliferation. For instance, the FDA defines a low acid food product with a pH of greater than 4.6 as shelf stable only if it has a water activity of 0.85 or less. Two foods with the same water content can vary significantly in their water activity depending on how much free water is in the system. When a food is in moisture equilibrium with its environment, the water activity of the food will be quantitatively equal to the relative humidity in head space of the container divided by 100.

Invariably, a high moisture content raises shelf life concerns. As a result, heat treatment of conventional peanut butter is essential. However, it has been determined that heating a low fat peanut butter with high moisture content will produce off flavors in addition to adversely impacting the color of the finished peanut butter. Carmalization and browning reaction takes place during the heat treatment which impart an undesirable appearance to the product. Alternatively, antimicrobial agents may be added, but only at the risk of limiting appeal to health conscious consumers. In any event, refrigeration of such a high moisture content product is essential in order retard the growth of mold, fungus, bacteria and the resulting spoilage. For example, the products described in US Patent No. 4,828,868 have a water activity over 0.95 and would be expected to require continuous refrigeration before and after opening.

The prior art is instructive by way of how the foregoing concerns have been approached. For instance, Yokoyama, et al., U.S. Pat. No. 4,814,195, teaches a reduced calorie peanut butter product containing from about 15 to about 40% by weight of a solid bulking agent having from 0 to about 3 calories per gram. However, the described products use polydextrose and microcrystalline cellulose, both of which require special pre-processing.

U.S. Pat. No. 4,828,868 to Lasden, et al. is directed to a low calorie, low fat peanut butter like product and the method for making the product. The method entails using unroasted defatted or partially defatted peanut flour having no more than about 35% fat by weight which is milled in the presence of water to a maximum particle size of about 150 microns. The water and flour mixture is then cooked at a temperature between 175° F. and the boiling point of the mixture. The moisture level of the finished product is high and would invariably necessitate that product be refrigerated for extended shelf life.

As another approach, U.S. Pat. No. 5,240,734 discloses a reduced fat peanut butter which is prepared as a water in oil emulsion containing a continuous peanut butter oil phase, a protein complexing agent, to maintain consistency of the oil phase, and a discontinuous aqueous coagulated protein phase, to reduce the fat content of the peanut butter. The discontinuous phase contains a coagulable dairy or vegetable protein and a protein coagulating agent.

A further example of an attempt to produce a low fat peanut butter is U.S. Pat. No. 5,302,409, in which a reduced fat peanut butter is made by removing oil from ground peanuts, preferably removed by centrifuging the ground peanuts until a supernatant oil layer is formed then decanted. The resulting peanut paste is then reground. Maltodextrin and modified food starch then can be added along with salt, butter flavoring, or peanut flavoring. This process is semicontinuous, thus limiting production. The product uses hydrated modified food starch which increases the moisture content and imparts a questionable shelf life.

U.S. Pat. No. 5,603,979 discloses a low fat peanut butter like product, shelf stable at room temperature. The product includes defatted peanut flour, water, humectant, soluble salt and a natural gum. The peanut butter product has a water activity of 0.80–0.85 and contains 70–95% less fat than conventional peanut butter. A pre-mix of hydrated natural gums is processed at elevated temperatures then mixed with conventional peanut butter. The mixed product has a high water content (approximately 24%) which must be heated/pasteurized at 180–190° F. for about 1–10 minutes. The result is excessive browning and off-flavors which limit the palatability of the finished product.

U.S. Pat. No. 5,591,477 describes a method of producing reduced fat peanut butter without non-peanut supplements. The invention involves making peanut flour using a defatting process and then mixing the flour with ground roasted peanuts and a selected amount of peanut oil to produce a peanut paste. The method further involves adding sweetener, dextrin, salt, flavorants and/or fiber, blending the resultant into a peanut product, then remilling the peanut product. However, this product does not meet the definition of low fat because only 30% of the fat content is reduced.

U.S. Pat. No. 5,536,524 discloses a method for providing a reduced fat and reduced calorie peanut buffer composition by incorporating therein an indigestible synthetic fat substitute, a polyol fatty acid polyester having at least four esterified hydroxyl groups. The polyol polyester is present in the mixture at a level from 10–25% by weight, resulting in a total fat content of 45–55% by weight, such that the final product has a reduced level of digestible fat. The acceptability of such a product is questionable due to the well-documented public resistance to incorporation of synthetic fats in food products and concerns over adverse physiological effects.

U.S. Pat. No. 5,230,919 discloses a reduced fat peanut butter produced using partially defatted peanut solids combined with regular peanuts under high shear mixing conditions. The defatting process is semi-continuous and comparatively expensive. The milling parameters are crucial. The process requires substantial reintroduction of peanut oil to produce a flowable product. The result is a rather exacting process which necessitates a high product cost.

U.S. Pat. No. 5,366,754 discloses a method for preparing a low fat, high moisture peanut butter composition and characterized by the following: 0–50% peanut flour, less than about 1% peanut oil, a peanut source from either a peanut paste derived from non defatted peanuts having about 50% peanut oil or a partially defatted peanut paste containing approximately 12–30% peanut oil. A humectant and emulsifier system is present at a level sufficient to provide a water activity of less than 0.91, but not so low as to dispense with antimicrobial agents and/or pasteurization, which are still required to extend the shelf life.

SUMMARY OF THE INVENTION

There are a considerable number of problems and deficiencies associated with low fat and/or low calorie peanut butter products or compositions of the prior art. There is a demonstrated need for such a product or composition having a water activity level which provides for stable shelf life, and a methodology toward such a product or composition.

It is an object of this invention to provide low calorie and/or low fat peanut butter products or compositions and method(s) for their preparation, thereby overcoming various deficiencies and short comings of the prior art, including those described above. It will be understood by those skilled in the art that one or more aspects of this invention can meet certain objectives, while one or more other aspects can meet certain other objectives. Each objective may not apply equally, in all instances, to every aspect of the present invention. As such, the following objects—in light of the prior art regarding peanut butter products/composition—can be viewed in the alternative with respect to any one aspect of the present invention.

It can also be an object of the present invention to provide a peanut butter product/composition with a water activity level low enough to inhibit bacterial propagation without resort to heat treatment during or after preparation.

It can also be an object of this invention to provide a peanut butter product/composition having a water activity level about or less than 0.80, and a method for preparing the same without heat treatment.

Another object of this invention can be to provide a predetermined water activity level of a peanut butter product/composition by controlling the amount and incorporation of humectant.

It can also be an object of this invention to provide a shelf stable peanut butter product/composition, as indicated by its water activity level, by way of a method not requiring heat treatment and/or antimicrobial agents.

It can also be an object of the present invention, with respect to one or more of the aforementioned products/ compositions, to provide a method of preparation without heat treatment, in order to, among other reasons, eliminate off flavor formation and browning reactions—which characterize the methods and high moisture peanut butter products of the prior art.

Other objects, features and advantages of the present invention will be apparent from this summary and description of preferred embodiments, and will be readily apparent to those skilled in the art having knowledge of low-fat and/or low calorie peanut butter products/compositions and their methods of preparation. Such objects, features, benefits and advantages will be apparent from the above as taken in conjunction with the accompanying examples, tables, data and all reasonable inferences to be drawn therefrom.

In part, the present invention is a cold low fat peanut butter product having a water content which provides a water activity level of less than 0.80. As used herein, the term "cold" refers broadly to a peanut butter product and/or composition prepared at ambient temperatures and/or without application of heat either to enhance dissolution or hydration, or to pasteurize the product/composition or inhibit the propagation of mold, fungus or bacteria. In preferred embodiments, the peanut butter product is about 10 wt. % to about 50 wt. % defatted peanut flour, and about 5 wt. % to about 20 wt. % humectant.

A humectant useful with the present invention is one commonly used with such food products, including but not limited to glycerin, propylene glycol, sorbitol, sodium lactate or combinations thereof In highly-preferred embodiments, the humectant is glycerin and/or is an amount sufficient to provide a water activity of about 0.68 to about 0.72. Accordingly, glycerin can be present at about 10 wt. % to about 20 wt. %. Correspondingly, the peanut flour component can be present at about 25 wt. % to about 50 wt. %. Without limitation, the peanut butter product of this invention can also include a bulking agent and/or unrefined sugar, the latter having particular appeal to health conscious consumers.

In part, the present invention can also include a low-fat peanut butter composition, including (1) a combination product of water with defatted peanut flour, and (2) a humectant in an amount sufficient to reduce the water activity of the composition to less than 0.80. In such a composition, the combination product can include about 10 wt. % to about 50 wt. % defatted peanut flour. Such a composition can also include about 5 wt. % to about 20 wt. % humectant. As stated above, various humectant materials can be utilized with this invention; however, a preferred humectant is glycerin.

In part, the present invention is a product and/or composition having a water activity of less than 0.80, obtainable without heating and by mixing defatted peanut flour and at least one additional dry ingredient, such as a bulking agent or sugar, than adding water and introducing a humectant in an amount sufficient to reduce the water activity to a level less than 0.80. Other dry ingredients can include, without limitation, a colorant and a flavorant.

In part, the present invention is a method of using a humectant to prepare a shelf-stable, low fat peanut butter product. The method includes: (1) providing defatted peanut flour, (2) mixing water with the flour to provide an initial water activity level, and (3) adding a humectant in an amount sufficient to reduce initial water activity level to a predetermined product level. Again, various commercially available humectants, and those know to individuals skilled in the art can be used. Such humectants include but are not limited to glycerin, propylene glycol, sorbitol, sodium lactate and combinations thereof. In various preferred embodiments, the method incorporates glycerin present at about 10 wt. % to about 20 wt. % of the peanut butter product. Likewise, the peanut flour is about 25 wt. % to about 50 wt. % of the peanut butter product.

In part, the present invention is also a method of preparing a shelf-stable low-fat peanut butter product at an ambient temperature. The method includes: (1) providing defatted peanut flour, (2) mixing water with the flour without application of heat to provide an initial water activity level, and (3) adding a humectant in an amount sufficient to reduce the initial water activity level to range of about 0.50 to about 0.80. As described more fully above, various humectant materials can be utilized with the method of this invention. Glycerin is preferred and can be utilized at concentrations similar to or consistent with those described above. Likewise, the amount of peanut flour utilized with this method is consistent with the weight percentages described more fully above. As described above, a peanut butter product/composition with a water activity below 0.80 or, alternatively, with a water activity level of about 0.65 to about 0.75 can be prepared in accordance with this invention without heat treatment, the absence of which results in enhanced flavor and color. Use of an increased amount of humectant—over that typically utilized—such as glycerin reduces the water activity to an appropriate level, thus eliminating the need for heat treatment. Through the method(s) of this invention, defatted peanut flour, a humectant and other ingredients can be used to produce an excellent low fat peanut butter product with distinct flavor, texture and mouthfeel. With an appropriate water activity level, no preservative or antimicrobial agent is necessary to extend the shelf life.

Various defatted flour materials are commercially available and can be used in conjunction with the present invention. Several such materials are especially useful and typically have a fat content of about 9–13 wt. %. Other flour materials, having a higher fat content, can be accommodated through use of this invention. Humectants of the type which can be used with this invention are also commercially available. Several are as described above and/or in the examples which follow. Other dry ingredients useful with the present method(s) and products/compositions will be known to those skilled in the art made aware of this invention. Other such ingredients include, for example: lecithin, maltodextrin, salt, peanut oil (to adjust the fat level of the finished product), sugar, colorants and other flavorants.

In preparing the peanut butter of this invention, the ingredients may be mixed in a high shear mixer, such as one available under either the Stephan or Preddo tradename. Such a mixer can be operated briefly under low shear conditions, combining the ingredients. After a period of two to three minutes, the resulting mixture is then subjected to high shear mixing to blend ingredients and promote hydration. No separate homogenization step is required with the present method. Further, no heat is required to provide the cold peanut butter of this invention. The product then is filled into suitable containers and stored at room temperature.

More particularly, a defatted peanut flour and the other the dry ingredients or bulking agents contemplated are first mixed at a low speed. The peanut flour chosen can be used at various levels, preferably from 20–50% and based on the preferred fat level in the finished formulation. Bulking agents such as low DE corn syrup having a DE of 10–100 can be used in this invention at a level of about 0–20 wt. %.

Sweetening agents such as sucrose, brown sugar, honey, dextrose or fruit concentrates may be utilized. The total amount of sweetener used can be about 0–10 wt. %. Salt can also be present at a level of about 0.5–0.2 wt. %. Antioxidants such as ascorbic acid and toccopherols can be added at a level of about 0–0.5 wt. % in order to retard or inhibit oxidative reactions later induced in the peanut butter. Other optional ingredients include colorants and flavorants for modifying the appearance as well as the flavor of the finished low fat peanut butter spread. Flavors that enhance the mouthfeel may also be utilized. Such flavorants, colorants and mouthfeel components are also available from commercial sources.

All of the dry ingredients and/or bulking agents are mixed together in a high shear mixer. The mixer is operated briefly under low shear conditions for approximately 1–3 and without heat to combine the dry ingredients, or for a time sufficient to obtain a homogeneous mix.

Water, glycerin and peanut oil can then be mixed with the dry ingredients, applying a shear action at high speed for approximately 1–3 minutes. Such mixing is, in accordance with this invention, accomplished at ambient temperature without the application of heat. The resulting mixture is then placed in containers. A nitrogen flush of the surface can be used to further retard or inhibit later oxidative reactions.

This invention provides a proper balancing of the ingredients such that a flowable product with a reduced water activity level can be produced commercially. A suitable humectant is utilized in order to reduce the water activity by binding the free water. Such a humectant is selected from numerous commercially-available materials, including but not limited to glycerin, propylene glycol, sorbitol, and sodium lactate. The humectant can be incorporated at a level ranging from about 5–20 wt. %. It has been noticed that, even though glycerin and sorbitol at higher levels impart some sweetness, such a quality does not adversely impact the taste or desirability of the finished product. Peanut extract or peanut oil may be incorporated at a level, typically up to about 0–20 wt. %, and as determined by the desired level of fat in the finished product. Peanut oil may be selected from a group of commercially available peanut oils with various flavor profiles, ranging from light to roasted flavor.

The peanut butter product/composition of the present invention requires no refrigeration at ambient storage conditions. In order to attain this remarkable attribute, the water activity is precisely controlled. A water activity of the finished product ranging from 0.65–0.75 or less is preferred in order to inhibit the growth of spoilage microorganisms. (By comparison, conventional peanut butter has a water activity less than 0.4). A water activity level of equal to or less than 0.73 is particularly preferred if no pasteurization or antimicrobial agents are utilized. A non-pasteurized low fat peanut butter with water activity above 0.75, prepared in accordance with this invention may under some conditions and over a prolonged time allow for a not unacceptable degree of growth of some mold strains, even though the proliferation of bacteria is inhibited. Such products/compositions, while not optimally desired, are commercially acceptable.

EXAMPLES OF THE INVENTION

The following non-limiting examples and data illustrate various aspects and features relating to the method(s) and resulting products/compositions of this invention, including the surprising and unexpected modification, control and/or improvement of the water activity level through use/incorporation of the humectants of this invention.

As illustrated with representative examples of the inventive methods and products/compositions, the water activity level can be controlled by use of and the weight percent of a humectant incorporated therein. The examples also illustrate how the shelf life and stability of such products/compositions can be modified and improved through use of this invention to provide a low-fat peanut butter product which can be prepared without heat treatment, and thereafter used or stored without refrigeration.

As discussed above, the humectants, as well as other components, described herein can be used effectively over the weight percent ranges provided. In this regard, the examples below are illustrative, to the extent that the methods described and products/compositions prepared can be extended to include higher or lower concentrations of a particular humectant, as well as the concentrations of other components, with a corresponding modification of water activity level.

Example 1

A compositional profile of a low fat peanut butter product containing 3% fat (and 94% less fat than conventional peanut butter) is shown below. The product possesses properties similar to conventional peanut butter, including, appearance, flavor, texture and consistency.

| Ingredients | Weight Percentage |
|---|---|
| Defatted Peanut Flour (12% Fat) | 30.0 |
| Natural Glycerin | 15.0 |
| Salt | 1.5 |
| Non-Fat Dry Milk | 4.0 |
| Sugar | 12.0 |
| Sweet Whey | 10.0 |
| Mouth Feel Enhancer | 15.0 |
| Water | 12.5 |

The product of this example has a water activity of 0.80, but showed some sign of surface mold growth after an extended time under the particular storage conditions used. While not especially desirable, some growth within limits is acceptable. The present invention accounts for the optional inclusion of antimicrobial ingredients. No bacterial proliferation was observed, however.

Example 2

A low fat peanut butter composition was formulated as described below:

| Ingredients | Weight Percentage |
|---|---|
| Defatted Peanut Flour (12% fat) | 30.0 |
| Natural Glycerin | 15.0 |
| Salt | 1.5 |
| Maltodextrin (10 DE) | 15.0 |
| Sugar | 8.0 |
| Peanut Oil | 4.0 |
| Mouth Feel Enhancer | 13.0 |
| Water | 13.5 |

The water activity of the resulting composition is approximately 0.78. It is 93% fat free and exhibits good eating qualities. Storage at room temperature for two months promoted minimal mold growth on the surface, as confirmed by a very low total platte count. As shown by this example, a certain level of peanut oil can be incorporated into a formulation, so as to provide certain attributes and still remain within the recognized definition of low-fat. The surface yeast and mold count of the fresh peanut butter product was under 10 per gram, then increased after two months of storage at room temperature to an acceptable 40 per gram. Again, antimicrobial agents could be formulated into this composition. However, no bacterial proliferation was observed, even in the absence of such an ingredient.

Example 3

Another low-fat peanut butter product was formulated, as shown below.

| Ingredients | Percentage |
|---|---|
| Defatted Peanut Flour (12% fat) | 30.5 |
| Natural Glycerin | 17.0 |
| Salt | 1.5 |
| Maltodextrin (10 DE) | 12.6 |
| Sugar | 7.4 |
| Peanut Oil | 3.5 |
| Mouth Feel Enhancer | 15.0 |
| Sorbitol | 10.5 |
| Dextrose | 2.0 |

The water activity of the product/composition prepared according to this example was found to be approximately 0.55. The product was 93% fat free.

Example 4

Another low-fat peanut butter product formulated as shown below.

| Ingredients | Percentage |
|---|---|
| Defatted Peanut Flour (12% fat) | 30.5 |
| Natural Glycerin | 15.0 |
| Salt | 1.5 |
| Maltodextrin (10 DE) | 4.0 |
| Sugar | 14.8 |
| Peanut Oil | 3.5 |
| Mouth Feel Enhancer | 15.0 |
| Sorbitol | 10.5 |
| Dextrose | 2.0 |
| Water | 3.2 |

The product was found to be 93% fat free with a water activity level of 0.58.

Example 5

This example demonstrates the preparation of a low fat peanut butter product employing an ingredient composition of the sort needed to provide water activity of approximately 0.72 and the resulting shelf stability observed.

| Ingredients | Percentage |
|---|---|
| Defatted Peanut Flour (12% Fat) | 30.0 |
| Natural Glycerin | 15.0 |
| Salt | 1.5 |

-continued

| Ingredients | Percentage |
|---|---|
| Maltodextrin (101 1E) | 14.0 |
| Sugar | 8.0 |
| Dextrose | 2.0 |
| Peanut Oil | 4.0 |
| Mouth Feel Enhancer | 15.0 |
| Water | 10.5 |

The water activity obtained through the product of this example inhibited bacterial growth over eight weeks of storage at room temperature. Furthermore, the mold and yeast count indicated that the product did not support yeast or mold growth over the same eight-week period.

Using the ingredients as shown in each of Examples 6A–E, 7A–C and 8A–D, a low fat peanut butter product can be prepared, having a water activity level and shelf stability in accordance with the present invention.

| Example 6 | A | B | C | D | E |
|---|---|---|---|---|---|
| Ingredients | | Weight Percentage | | | |
| Defatted Peanut Flour | 12 | 17 | 25 | 35 | 46 |
| Natural Glycerin | 6 | 7.5 | 13 | 16 | 21 |

| Example 7 | A | B | C |
|---|---|---|---|
| Ingredients | | Weight Percentage | |
| Defatted Peanut Flour | 12 | 17 | 25 |
| Sodium Lactate | 6 | 7.5 | 13 |

| Example 8 | A | B | C | D |
|---|---|---|---|---|
| Ingredients | | Weight Percentage | | |
| Defatted Peanut Flour | 10 | 14 | 28 | 33 |
| Glycerin/Propylene Glycol Mixture | 5 | 8 | 15 | 16 |

Example 9

The data of this example summarizes the microbiological activity of the peanut butter of Example 5 (Aw=0.72), as monitored over an eight-week period. The data confirms shelf stability, in accordance with this invention.

| A. | Plate count - Initial | 110 c.f.u./gram |
|---|---|---|
| | Week 1 Total Plate Count | 110 c.f.u./gram |
| | Week 2 Total Plate Count | 80 c.f.u./gram |
| | Week 3 Total Plate Count | 60 c.f.u./gram |
| | Week 4 Total Plate Count | 70 c.f.u./gram |
| | Week 5 Total Plate Count | 100 c.f.u./gram |
| | Week 6 Total Plate Count | 90 c.f.u./gram |
| | Week 7 Total Plate Count | 140 c.f.u./gram |
| | Week 8 Total Plate Count | 80 c.f.u./gram |

| B. | Yeast & Mold Count - Initial | <10/gram |
|---|---|---|
| | Week 1 Yeast & Mold | <10/gram |
| | Week 2 Yeast & Mold | <10/gram |
| | Week 3 Yeast & Mold | <10/gram |
| | Week 4 Yeast & Mold | <10/gram |
| | Week 5 Yeast & Mold | <10/gram |
| | Week 6 Yeast & Mold | <10/gram |
| | Week 7 Yeast & Mold | <10/gram |
| | Week 8 Yeast & Mold | <10/gram |

Example 10

The peroxide value is an indication of rancidity development. The following data was accumulated by monitoring the peanut butter of Example 5 over an eight-week period.

| Initial Peroxide Value | 0.26 Meg/Kg |
|---|---|
| Peroxide Value (After Four Week) | 0.22 Meg/Kg |
| Peroxide Value (After Eight Week) | 0.23 Meg/Kg |

Note that the subject peanut butter was not formulated with an antioxidant. The initial peroxide value of the low fat peanut butter spread was very low and remained the same over eight weeks, indicating that the product is not prone to any rancidity/oxidative reaction. It should also be noted that the peanut butter of Example 5, while meeting the above criteria, also exhibited excellent consumer qualities in terms of taste and mouth feel.

While the principals of this invention have been described in connection with specific embodiments, it should be understood clearly that these descriptions, along with the chosen tables and data therein, are made only by way of example and are not intended to limit the scope of this invention, in any manner. For example, the products/compositions can be prepared using various other flour materials having characteristics and originating from sources other than those described above. Likewise, an appropriate amount of conventional peanut butter can be incorporated in the product/composition of this invention, but is not required to obtain the qualities, water activities and/or shelf stability described herein. Other advantages and features of this invention will become apparent from the following claims, with the scope thereof determined by the reasonable equivalents, as understood by those skilled in the art.

What is claimed is:

1. A cold, low fat peanut butter product comprising water and and a humectant selected from the group consisting of glycerin, propylene glycol, sorbitol, sodium lactate and combinations thereof and having a water activity level of less than 0.80.

2. The peanut butter product of claim 1 comprising: about 10 wt. % to about 50 wt. % defatted peanut flour, and about 5 wt. % to about 20 wt. % humectant.

3. The peanut butter product of claim 2 wherein said glycerin is about 10 wt. % to about 20 wt. %, and said peanut flour is about 25 wt. % to about 50 wt. %.

4. The peanut butter product of claim 3 further comprising a bulking agent.

5. The peanut butter product of claim 2 further comprising unrefined sugar.

6. The peanut butter product of claim 1 wherein said humectant is glycerin.

7. The peanut butter product of claim 6 wherein said humectant is in an amount sufficient to provide a water activity level of about 0.68 to about 0.72.

8. A low fat peanut butter composition, comprising water, a peanut component; and a humectant selected from the group consisting of glycerin, propylene glycol, sorbitol, sodium lactate and combinations therein in an amount sufficient to reduce the water activity to less than 0.80, said component consisting of defatted peanut flour.

9. The peanut butter composition of claim 8 comprising:
about 10 wt. % to about 50 wt. % defatted peanut flour, and about 5 wt. % to about 20 wt. % humectant.

10. The peanut butter composition of claim 8 wherein said humectant is glycerin, and wherein said peanut component further includes peanut oil.

11. A method of using a humectant to prepare a shelf-stable low fat peanut butter product, said method comprising:

providing defatted peanut flour;

mixing water with said flour without the application of heat to provide an initial water activity level; and adding a humectant in an amount sufficient to reduce said initial water activity level to a predetermined level.

12. The method of claim 11 wherein said humectant is selected from the group consisting of glycerin, propylene glycol, sorbitol, sodium lactate and combinations thereof.

13. The method of claim 12 wherein the humectant is glycerin present at about 10 wt. % to about 20 wt. % of the peanut butter product, and said peanut flour is about 25 wt. % to about 50 wt. % of the peanut butter product.

* * * * *